United States Patent [19]

Arthur et al.

[11] Patent Number: 5,207,179
[45] Date of Patent: May 4, 1993

[54] PET CONFINEMENT SYSTEM

[76] Inventors: David L. Arthur, 12456D Sealane Dr., Florissant, Mo. 63033; David S. Pohlman, 208 Carlyle Lake Dr., Creve Coeur, Mo. 63141

[21] Appl. No.: 882,483

[22] Filed: May 13, 1992

[51] Int. Cl.⁵ .................... A01K 3/00; G08B 23/00
[52] U.S. Cl. .................................. 119/29; 340/573
[58] Field of Search ................ 119/29, 106; 340/573

[56] References Cited

U.S. PATENT DOCUMENTS

| | | | |
|---|---|---|---|
| 3,589,337 | 6/1971 | Doss | 119/29 |
| 3,753,421 | 8/1973 | Peck | 119/29 |
| 3,777,712 | 12/1973 | Gardner et al. | 119/29 |
| 3,874,339 | 4/1975 | Coulbourn | 119/29 |
| 3,897,753 | 8/1975 | Lee et al. | 119/29 |
| 3,980,051 | 9/1976 | Fury | 119/29 |
| 4,114,352 | 9/1978 | Horton et al. | 119/106 |
| 4,622,544 | 11/1986 | Bially et al. | 340/573 |
| 4,669,424 | 6/1987 | Bianco et al. | 119/156 |
| 4,710,751 | 12/1987 | Webster | 340/573 |
| 4,733,633 | 3/1988 | Yarnall | 119/29 |
| 4,745,882 | 5/1988 | Yarnall | 119/29 |
| 4,780,706 | 10/1988 | Bollag | 340/666 |
| 4,895,110 | 1/1990 | LeCascio | 119/106 |
| 4,898,120 | 2/1990 | Brose | 119/29 |
| 4,967,695 | 11/1990 | Giuuta | 119/29 |
| 4,967,696 | 11/1990 | Tobias | 119/29 |
| 5,067,441 | 11/1991 | Weinstein | 119/29 |

FOREIGN PATENT DOCUMENTS

| | | | |
|---|---|---|---|
| 3405171 | 8/1985 | Fed. Rep. of Germany | 119/29 |
| 2455843 | 1/1981 | France | 119/29 |
| 2523809 | 9/1983 | France | 119/29 |

Primary Examiner—John G. Weiss
Attorney, Agent, or Firm—Rogers, Howell & Haferkamp

[57] ABSTRACT

A pet confinement system includes a loop antenna for placement about the border of an area within which the pet is desired to be confined, a control panel for recording a voice command in the pet owner's voice, and means for generating an RF signal encoded with said prerecorded voice command for transmission over said antenna. A receiver is mounted to a collar for attachment to a pet such that as the pet approaches the antenna the pet owner's voice command is received from the antenna and announced to the pet to encourage him to withdraw from the border. A threshold level detector detects when the pet approaches even closer to the antenna and the collar includes a pair of electrodes for applying a shock to the pet to further reinforce the pet owner's voice command and convince the pet to withdraw from the border. The control panel further includes monitoring circuits for monitoring the integrity of the loop antenna and the AC power supply. If a break is detected in the loop antenna, or if the control panel switches to its included battery backup, a display provides a visual message and an announcement is made over a speaker in the control panel to alert the operator that a system failure has occurred.

26 Claims, 6 Drawing Sheets

PET CONFINEMENT SYSTEM

BACKGROUND AND SUMMARY OF THE INVENTION

Systems for controlling dogs, and other pets, from moving out of a predetermined area are known in the art. The prior art systems typically consist of an RF signal generator driving a loop antenna, and a matched RF signal receiver attached to a dog collar. Prior to use, the loop antenna is strung out, and perhaps buried, around the boundaries of the predetermined area and so, when energized, defines an apparent fence constituted of radiating RF signals in the vicinity of the boundaries. In use, as the dog approaches the boundary-determining antenna, the matched receiver picks up the signal and in response activates an electrical circuit which produces a shock to the dog. It is also typical that the prior art systems will have the electric shock increase in intensity as the dog approaches the antenna closer still. As an alternative to a shock, a loud noise can be created which is intended to annoy the dog and drive it back. A prior art system exemplary of the above is shown by U.S. Pat. No. 3,753,421.

Other prior art systems for controlling dogs to remain within a predetermined area include both a hand-held RF transmitter (or "walkie-talkie") and a matched RF receiver on a dog collar to facilitate live broadcasts of verbal commands to the dog. A prior art system exemplary of this latter concept is shown by U.S. Pat. No. 4,745,882.

There are several disadvantages associated with the prior art systems. As previously indicated, the automatic systems achieve control over the dog by typically subjecting the dog to an alarming noise or by an electric shock, and both the noise and the shock are designed to annoy, offend or startle the dog. Unfortunately, in practice, these shocks may be so extreme as to cause pain, which most caring pet owners are loathe to inflict on their pets. Even if the shock intensity is controlled properly to limit the "pain", many dog owners are reluctant to use these prior art systems because of their objection to the basic premise of shocking their pet. As such, these systems all rely on a negative feedback and do not take advantage of the training most dogs receive to obey voice commands from their masters. As for the "walkie-talkie" system, it is chiefly deficient in not operating automatically.

Further disadvantages associated with the automatic prior art systems involve the absence of self-monitoring functions. That is, since control of the dog is achieved while the prior art systems operate in an automatic mode, there is no provision for alerting the system user when there is a system malfunction. For example, such malfunctions can include a break in the loop antenna, or loss of AC power, or a more serious system failure, any of which would result in ineffective confinement of the pet. Further disadvantages associated with the prior art systems involve the lack of facility with these systems for use by pet owners who are sightless or hearing impaired.

In order to solve these and other problems in the prior art, the inventors herein have succeeded in designing and developing a pet confinement system which announces a command to the dog, in the owner's voice, to retract from the edge of the yard or the like as the dog draws near. Additionally, an 18K tone is broadcast which is inaudible to humans but which is irritating to the dog. Should the dog ignore the command and tone, and advance even closer, the dog will receive a shock to more directly indicate to him that, not only has he gotten too close, but he has also disobeyed his master's command. This positive reinforcement of a voice command makes it more likely that the dog will follow the voice command the next time he hears it, and thus avoid the shock. With the present invention, a more humane solution to the pet confinement problem has been achieved. Furthermore, the confinement system takes advantage of one of the most basic forms of training which is commonly used with pets, i.e. voice training, and therefore makes its implementation more readily adaptable and much more likely to be successful as it builds on this common training. In other words, the present invention may very well be implemented where prior art systems fail as the dog, for whatever reasons, fails to associate the shock with the prohibited crossing of the border and fails to remain confined.

In implementing the present invention, the inventors herein have also designed and developed a master control panel which not only provides for an operator to prerecord a command of his own choosing and to which the dog is most likely to respond, but also monitors the system and indicates to an operator when any one of the most common malfunctions occurs. The master control panel includes a display and an audio announcement when a break in the loop antenna occurs, or when there is a loss in AC power and the system is on battery backup. As the master control panel is typically mounted in the garage, an operator will regularly pass by the control panel on his way to and from his car, and in doing so will be notified by the visual and audio announcement of a system failure. This feature also renders the system "user friendly" for a sightless or hearing impaired owner who would have difficulty with a prior art system and who is probably more likely than others to own a pet.

In accordance with the present invention, the pet confinement system has a loop antenna for placement about a boundary of a confinement area and around shrubs and the like, and a control panel connected to the loop antenna for generating and broadcasting an RF signal thereover. The control panel includes circuitry for recording a spoken command in the pet owner's own voice, and RF circuitry for generating an RF signal encoded with the spoken command for transmission over the loop antenna. This pet confinement system also has a portable battery operated RF receiver adapted for attachment to a pet collar. The portable RF receiver includes an RF detector and miniature audio speaker for decoding and announcing the spoken command and tone in response to the pet moving within a predetermined distance of the antenna. The recorded spoken command can be something like "Fido, get back. Get back Fido, get back.", or the like, which is the same spoken command which is used to train the pet upon system installation.

The portable RF receiver further includes a threshold level detector for detecting reception of the tone at an intensity indicative of the pet being within a second, closer, predetermined distance to the loop antenna. A circuit for applying a pulsed shock to the pet is responsive to this threshold level detector. These pulsed shocks reinforce the dog's obedience to his master's command and further dissuade him from passing outside the antenna barrier. Most dogs soon learn that disobeying the master's voice command results in a shock, and thus most often avoid any shock after only a few excursions towards the border.

The control panel additionally includes circuitry which monitors for system failures, and both visual and audio indicators for indicating any system failures to a system operator. These indicators include an LCD screen for displaying preprogrammed messages, and a console speaker for announcing prerecorded messages. One of the monitoring circuits is a circuit for monitoring the loop antenna. In operation, it detects whether the loop antenna fails to conduct an electric current. The other of the monitoring circuits detects whether the standard 120 VAC power supply has failed.

While the principal advantages and features of the present invention have been disclosed above, a more complete understanding of the invention may be attained by referring to the drawings and description of the preferred embodiment which follow.

DETAILED DESCRIPTION OF THE PREFERRED EMBODIMENT

Figure 1:
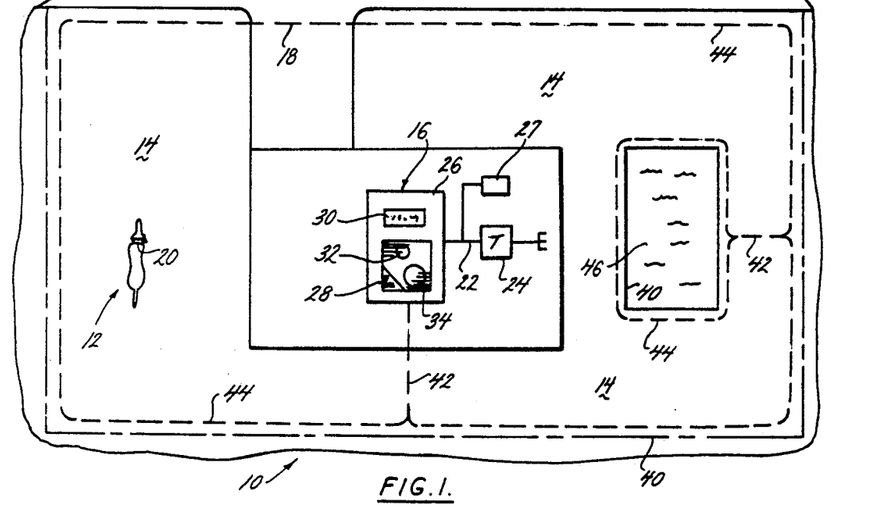
FIG. 1 is a plan view of the pet confinement system of the present invention installed in a homeowner's yard.

A pet confinement system 10 is provided for confining a pet 12 within a confinement area 14, as is generally illustrated in FIG. 1. This pet confinement system 10 generally comprises a system control panel 16, which continuously generates and transmits an RF signal to a loop antenna 18, for the purpose of establishing a wireless communication link with a battery operated RF receiver 20 which is adapted to be carried by the pet 12 as it travels throughout the confinement area 14.

This system control panel 16 generally has the provision for a hook-up with 120 V 60-cycle AC power supply by means of a line cord 22. Line cord 22 terminates in a step-down transformer 24, which itself has provisions for direct plug-in to a standard 120 VAC outlet. This system control panel 16 is contained in a console housing 26.

As a safeguard against interruption of the 120 VAC power supply, the system control panel 16 is also provided with a battery back-up 27 which is actually contained within housing 26. The console housing 26 of the system control panel 16 is made from any suitable material such as high strength plastic. In addition, the console housing 26 also provides a mounting surface for several electronic devices, including a key pad 28, an LCD display 30, a microphone 32 and a console audio speaker 34. Also, the console housing 26 includes well-known provisions for fastening it to a wall or a like mounting structure, at locations either within or outside of the confinement area 14.

The loop antenna 18 is generally adapted for placement about selected boundaries 40 of the confinement area 14. More particularly, some of the placement of this loop antenna 18 has the loop antenna 18 configured in twin strand segments 42, while the remainder of the placement of this loop antenna 18 has it configured in single strand segments 44. Both kinds of segments 42 and 44 are generally buried in the ground between three and six inches deep. As illustrated in FIG. 1, the selected boundaries 40 of the confinement area 14 may be the property line of a residential property, and may also be the borders of an area like a swimming pool 46 or even around flower beds or shrubs, for excluding the pet 12 therefrom. The twin strand segments 42 interlink spaced apart loops of single strand segments 44, as illustrated in FIG. 1. The twin strand segments 42 also interlink the system control panel 16 with the loops of single strand segments 44. The twin strand segments 42 can be interwound in a twisted arrangement for the purpose of effectively canceling out the magnetic field which is to be produced by each single strand segment 44, to thereby prevent the command and shock from being administered to the pet.

Figures 2, 3:
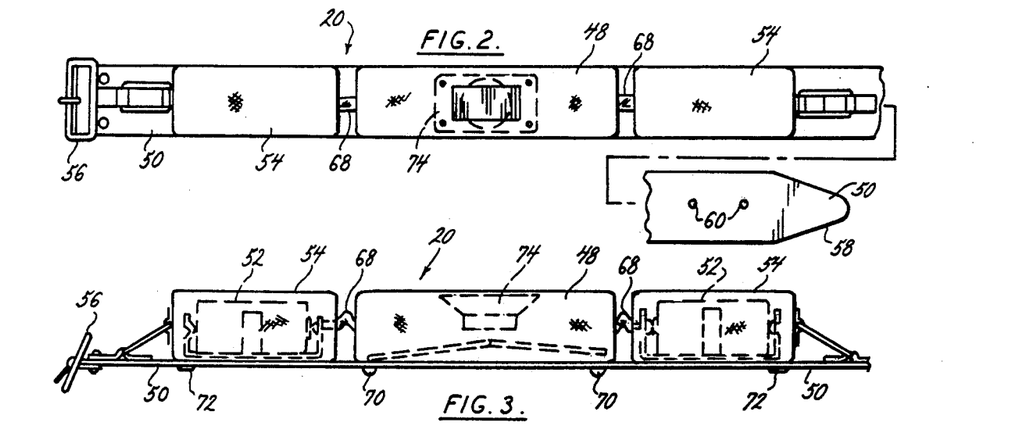
FIG. 2 is a plan view of a pet collar.
FIG. 3 is a side view of the pet collar of FIG. 2.

The battery operated RF receiver 20 is encased within its own housing 48 and this housing 48 is mounted to a pet collar 50, as generally illustrated in FIGS. 2 and 3. The RF receiver 20 is powered by a pair of batteries 52 which are encased in their own housings 54, and are mounted on the pet collar 50 to flank the housing 48, as is generally illustrated in FIGS. 2 and 3. This collar 50 has one end provided with a buckle 56 and its opposite end 58 provided with regularly disposed holes 60. To permit this pet collar 50 to be flexed into a circular configuration, these housings 48 and 54 are flexibly interlinked with each other by electrical interconnections 68.

Figure 4:
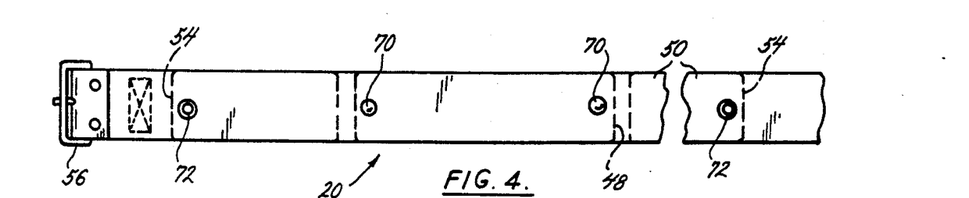
FIG. 4 is a bottom view of the pet collar of FIGS. 2 and 3.

As illustrated in FIGS. 3 and 4, a pair of shock imparting electrodes 70 protrude through the pet collar 50 on the side opposite to the side on which the housing 48 is mounted. Similarly, a pair of battery recharger posts 72 protrude through the pet collar 50 on the side opposite to the side on which the battery housings 54 are mounted to facilitate recharging of the batteries in place.

Figure 5:
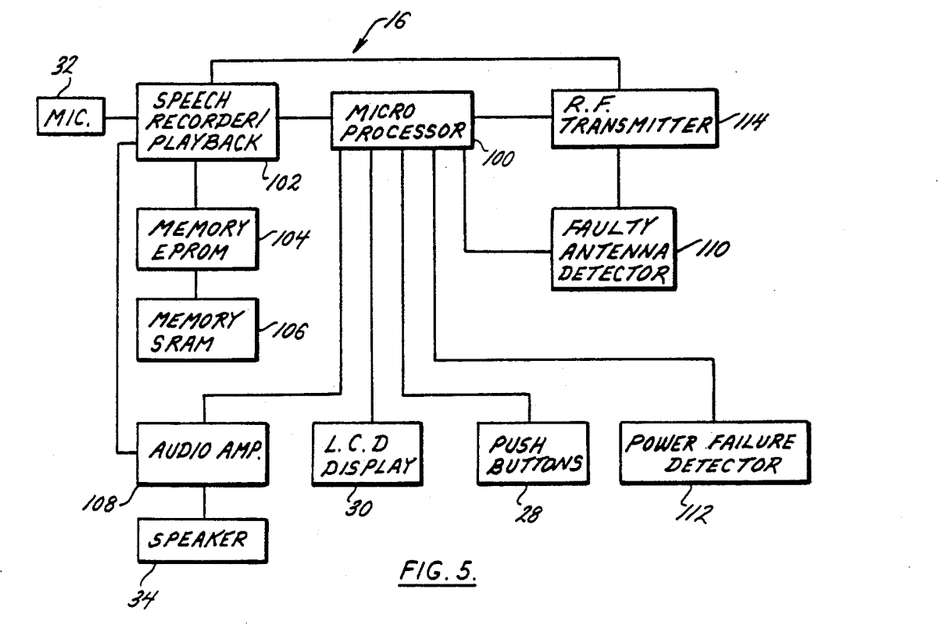
FIG. 5 is a block diagram of the system control panel.

The system control panel 16 and its electronic circuits and components are generally exemplified in the block diagram of FIG. 5. These circuits and components include a microprocessor 100 which may be an MC68705P3. There is also a digital voice recorder 102 which may be an SP-1000-1, or a United Microelectronics Corp. UM93510 AH/BH. EPROM 104, which may be a 27C256, provides memory for "playback" of prerecorded messages which are to be announced over the console audio speaker 34, by way of an interconnecting audio amplifier 108. These messages include: "Record a New Message"; "System on Battery Backup"; "Check Loop Antenna"; and capacity for future addition of a message. A static RAM 106, which may be a 61256, provides memory for the recording and "playback" of 11.5 seconds of the system operator's/pet owner's spoken command. To facilitate the "record" function, there is also the console microphone 32, mentioned above. Both of these IC's have 256K memories which provide about 11½ seconds of a recorded command.

When power is applied to the system for the first time, or if the charge of the battery backup system is exhausted, a digitally stored message such as "Please Record a New Message" is played to the owner through a speaker mounted in the control center. At the same time a written message would be displayed on a liquid crystal display mounted on the control center. These verbal and displayed messages would continue until such a time when the owner pushes the record button on the control center. When this button is pushed a new message is displayed on the liquid crystal display such as "Start Recording Your Message Now". The owner then talks into a microphone to record the message that he wants his animal to hear. The message would be something like "Bad, bad dog, get back dog, get back". After a predetermined amount of time, such as 11.5 seconds, a new message appears on the liquid crystal display such as "Stop Recording Your Message" to indicate that the recording time has elapsed.

The electronic circuits of this system control panel 16 also include a pair of self-monitoring components. Namely, a faulty antenna detector 110 and a power failure detector 112. Generally, the faulty antenna detector 110 is interlinked with an RF transmitter circuit 114, and detects whether the loop antenna 18 should fail to conduct. In the event that the loop antenna 18 should not, the faulty antenna detector 110 transmits a signal to the microprocessor 100, which in response generates "indicators" which are perceptible to the system operator. These "indicators" include a visual display of pre-programmed messages over the LCD screen 30, and include an audible announcement of the messages prerecorded in the memory of the EPROM 104 over the console speaker 34. The power failure detector 112 operates in a like manner, and causes a like result in the event of failure of the 120 VAC power supply.

The electronic circuits and components of this system control panel 16 are, more particularly, mounted on three circuit cards. Accordingly, there is a mother board 200 illustrated in FIG. 8, a logic board 202 illustrated in FIG. 9, and a switch board 204 illustrated in FIG. 10.

Figure 8:
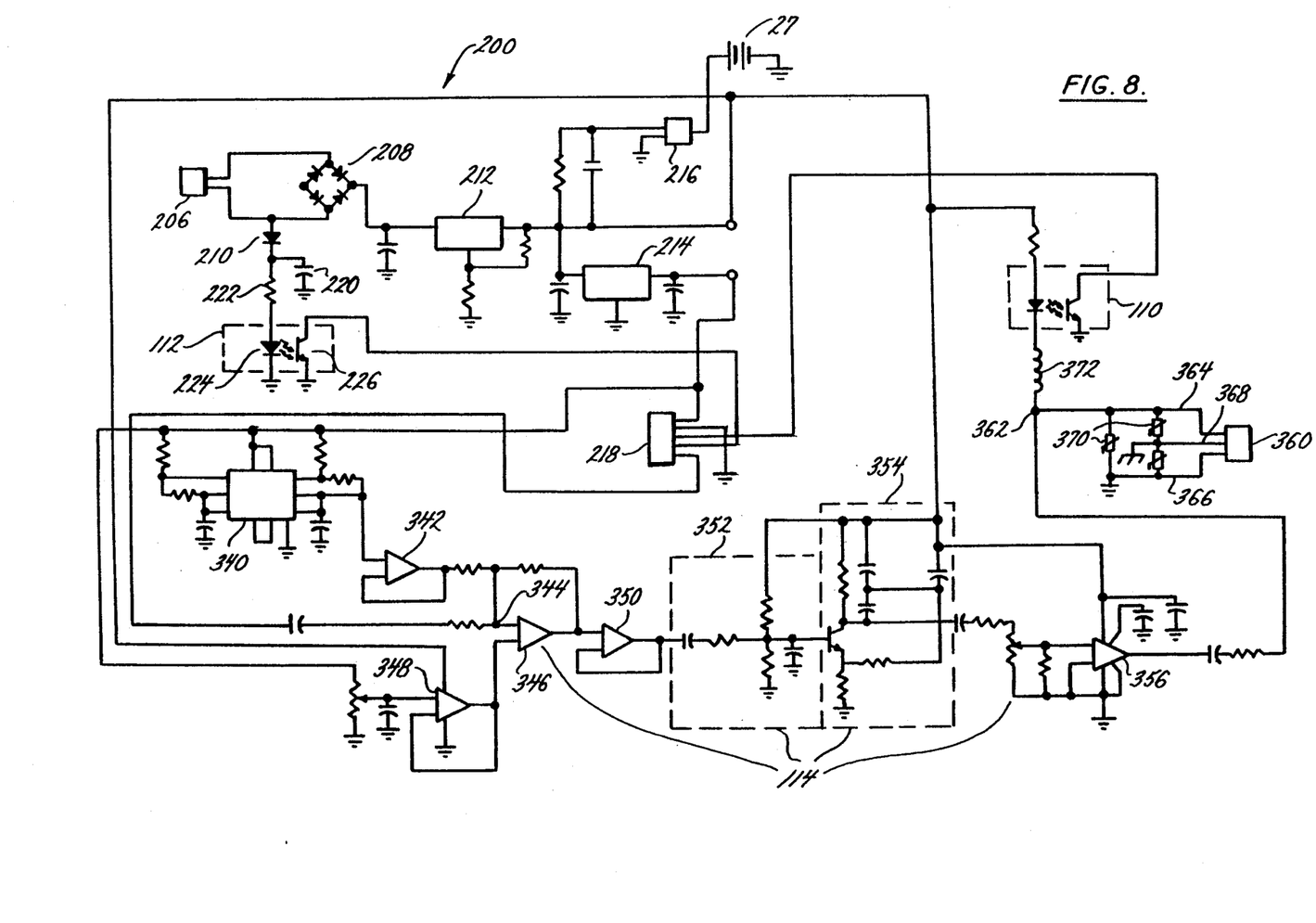
FIG. 8 is a schematic of the mother board of the system control panel.

With reference to FIG. 8, the line cord 22 (FIG. 1) brings AC power to this mother board 200 at connector 206. The power from connector 206 feeds both a full-wave rectifier bridge 208 and a single-diode rectifier 210. The rectified output of bridge 208 is inputted to a voltage regulator 212 which may be an LM317. The voltage regulator 212 generates a regulated 12 VDC which is used for several purposes. That is, the 12 VDC is supplied to another voltage regulator 214, to a select few electronic components which are mounted on the mother board 200, and to the battery back-up 27, by way of connection 216. The second voltage regulator 214 may be an LM7805, and generates a regulated 5 VDC which is used for providing a control voltage for all the electronic circuits and components of the mother board 200 which do not use 12 VDC. In addition, by way of connector 218, the 5 VDC power is supplied to the logic and switch boards 202, 204.

The rectified current conducted through diode 210 is filtered by capacitor 220 and fed through resistor 222 to the power failure detector 112, mentioned above. The power failure detector 112 may be a PS2501-2 optoisolator. LED 224 illuminates so long as there exists a current from the AC power supply. LED 224 actuates phototransistor 226. When current ceases to flow through LED 224, this is indicative of the failure of the 120 VAC power supply. Microprocessor 100 monitors the output of the phototransistor 226 for determining whether the 120 VAC power has failed. When the microprocessor 100 determines that the 120VAC power has failed, it causes a visual and audio indication, described below. Also, if the 120VAC power should fail, the battery back-up 27 supplies power through connection 216 to the mother board 200 at a nominal 12 VDC, and 5 VDC voltage from regulator 214, as well.

Figure 9:
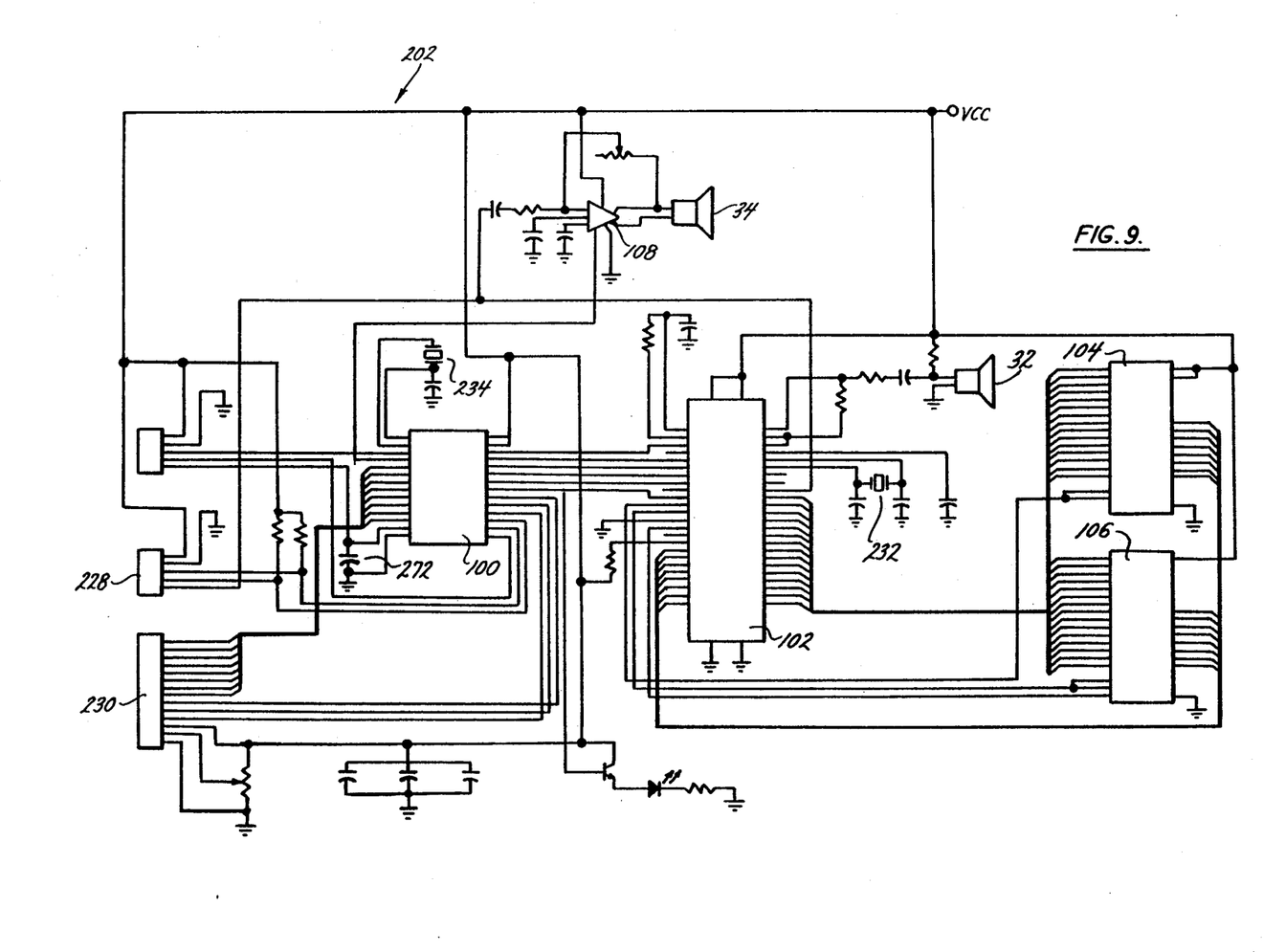
FIG. 9 is a schematic of the logic board of the system control panel.

With reference to FIG. 9, the logic board 202 has a connector 228 through which 5 VDC power is supplied, as developed on the mother board 200 (FIG. 8) and conveyed through connector 218, mentioned above. It is the logic board 202 which has mounted on it the microprocessor 100, the digital voice recorder 102, the EPROM and the SRAM 106. A flowchart for the microprocessor's program is shown in Attachment A.

Figure 7:
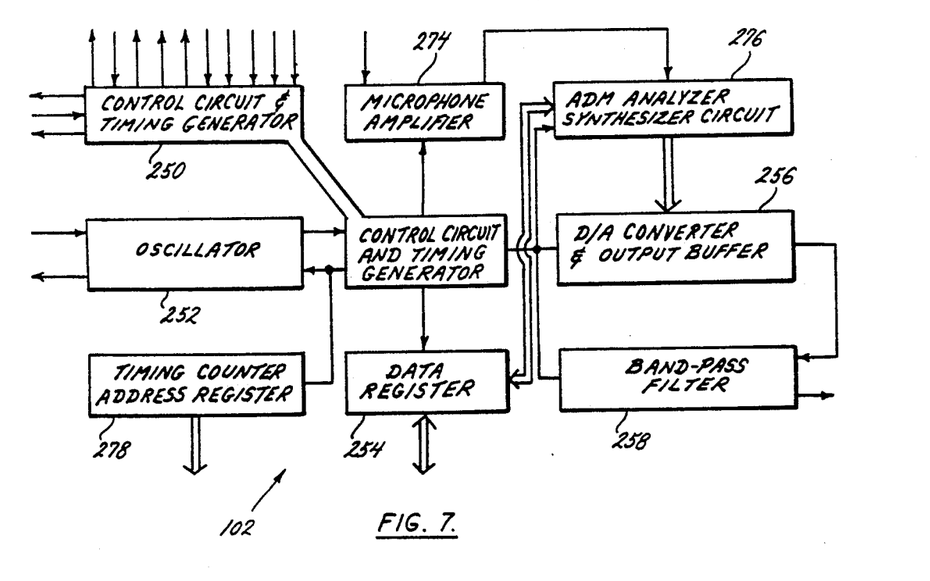
FIG. 7 is a block diagram of the digital voice recorder IC.

The digital voice recorder 102's internal electronic circuits and components are exemplified in the block diagram of FIG. 7. The circuits and components of the digital voice recorder 102 include a control and timing generator circuit 250 which responds to control signals sent by the microprocessor 100, as well as generates its own control signal outputs. The control signals which are outputted by the control and timing generator circuit 250 include a "busy" signal which is sent to the microprocessor 100, a "playback" signal which is sent to the EPROM 104, and "playback" and "record" signals which are sent to the SRAM 106. The clock pulses for this control and timing generator circuit 250 are provided by a local oscillator circuit 252 which is in communication with the crystal oscillator 232 (FIG. 9).

To facilitate the general "playback" operation of this digital voice recorder 102, its internal electronic circuits further include a data register 254 which is interlinked by data buses with both the EPROM 104 and SRAM 106. There is also a digital-to-analog converter which converts a digitized spoken message or command into an audio signal. There is also a band-pass filter 258 which filters the audio signals before being amplified by audio amplifier 108 and the RF transmitter circuits 114, under control.

Figure 10:
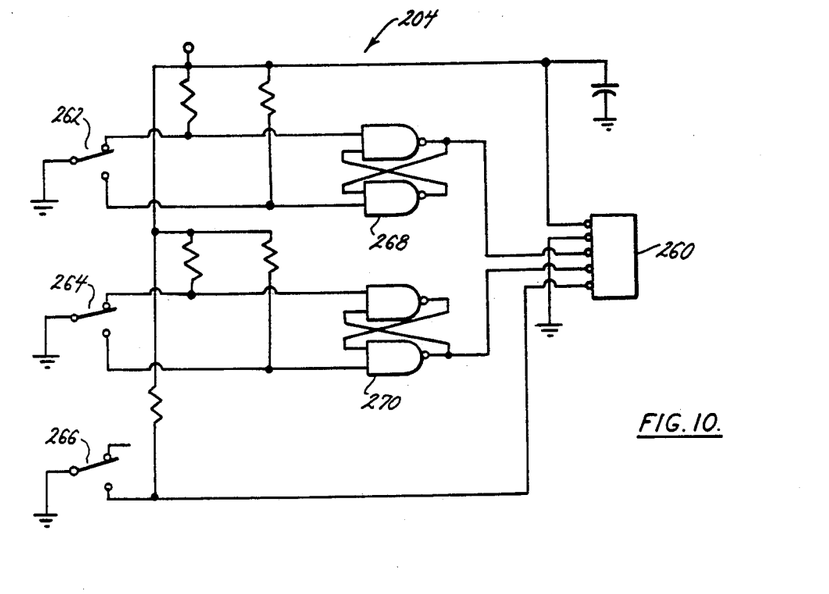
FIG. 10 is a schematic of the switching board of the system control panel.

With reference to FIG. 10, the switch board 204 has a connector 260 which interlinks the switch board 204 and logic board 202 (FIG. 9). The 5 VDC power is also conveyed through connector 260. The switch board 204 is operably linked with three pushbuttons which are mounted on the keypad 28 (FIG. 1). There are a "record" push-button 262, a "playback" pushbutton 264 and a "reset" pushbutton 266. Cross connected logic gates 268, 270 eliminate contact bounce.

The digital voice recorder 102, as exemplified in the block diagram of FIG. 7, includes a microphone amplifier 274, an ADM analyzer/synthesizer circuit 276, and data and address registers 254 and 278.

Under its own "record" procedure, the digital voice recorder 102 has its control and timing generator circuit 250 transmit a signal to the SRAM 106 for preparing it for recording. From that time forward, the system operator/pet owner may speak into the microphone 32 for the recording of a spoken command not longer than 11½ seconds. The microphone 32 transmits an audio signal to the microphone amplifier 274, for transmission therefrom to the ADM analyzer/synthesizer circuit 276. The ADM analyzer/synthesizer circuit 276 converts the analog audio signal into a digital one, as is known in the art. This digital signal is conveyed to the data register 254. Each binary "word" in the data register 254 is coupled with an incrementally changing binary "word" address in the address register 278. These coupled address and data "words" are coordinately transmitted onward to the SRAM 106 (FIG. 9), for digital storage thereof. After the recording time has elapsed, about 11½ seconds, the control and timing generator circuit 250 clears the transmission of the "busy" signal.

The system operator/pet owner can manually actuate the "playback" pushbutton 264 (FIG. 10), which activates the microprocessor to transmit an appropriate "playback" signal to the digital voice recorder 102. The digital voice recorder 102 has its own "playback" procedure, as has been generally described above, which results in the audible announcement of the recorded command in the SRAM 106 over the audio speaker 34.

With reference to FIG. 8, the RF transmitter circuits 114 are generally mounted to the mother board 200. The audio signal from the digital voice recorder 102 (FIG. 9) is conveyed through connector 228 of the logic board 202 (FIG. 9) and connector 218 of the mother board 200.

These RF transmitter circuits 114 include an 18 kHz tone generator 340 with 1 second on 1 second off times outputting to a unity gain buffer 342. The unity gain buffer 342 outputs a noninverted 18 kHz signal for a low impedance load by way of junction 344. The audio signal is also conducted into junction 344. These two signals are conducted together from junction 344 to a mixer 346 where they are combined. For simplicity, this mixed signal including both the prerecorded voice command and the 18 kHz tone shall be referred to as the voice encoded signal. Elsewhere, the control voltage is inputted into a unity gain buffer 348, and the output of the unity gain buffer 348 for a low impedance load is likewise inputted to the mixer 346. The mixer 346 outputs an intermediate frequency AM signal to another unity gain buffer 350, which in turn outputs a noninverted signal for a low impedance load. This AM-IF signal is passed through an RC filter circuit 352 to an RF oscillator 354. The RF oscillator 354 includes an LC tank circuit continuously resonating at the desired 455 kHz. The output of this RF oscillator 354 is a voice encoded 455 kHz RF signal. The voice encoded RF signal output of this RF oscillator 354 is inputted to an RF amplifier 356 which may be an LM384, for amplifying the voice encoded RF signal for consequential output to the loop antenna 18 through connector 360, by way of junction 362. The loop antenna 18 (FIG. 1) is connected to the mother board 200 of this system control panel 16 at connector 360. When this loop antenna 18 is operational and an amplified RF signal is applied to it, this loop antenna 18 broadcasts an RF signal which is first detectable by the RF receiver 20 (FIG. 1) at approximately 5 feet. Connector 360 has three lines 364, 366 and 368 for input, chassis ground and mother board 200 ground, respectively. These three lines 364, 366 and 368 are all interlinked by varistors 370 which may be P7136's, for surge protection.

At junction 362, the other incoming branch conducts current from the faulty antenna detector 110. The faulty antenna detector 110 is an optoisolator which may be a PS2501-2, just like the power failure detector 112. This faulty antenna detector 110 has a throughput current which energizes an LED, as has already been described, to RF choke 372, junction 362, and then over the loop antenna 18 through connector 360 and back again to mother board ground on line 368. Thus, any break in the loop antenna 18 will correspondingly break the circuit, hence de-energizing the faulty antenna detector 110's LED. The microprocessor 100 responds to a negative indication in a manner which has already been described.

Figure 6:
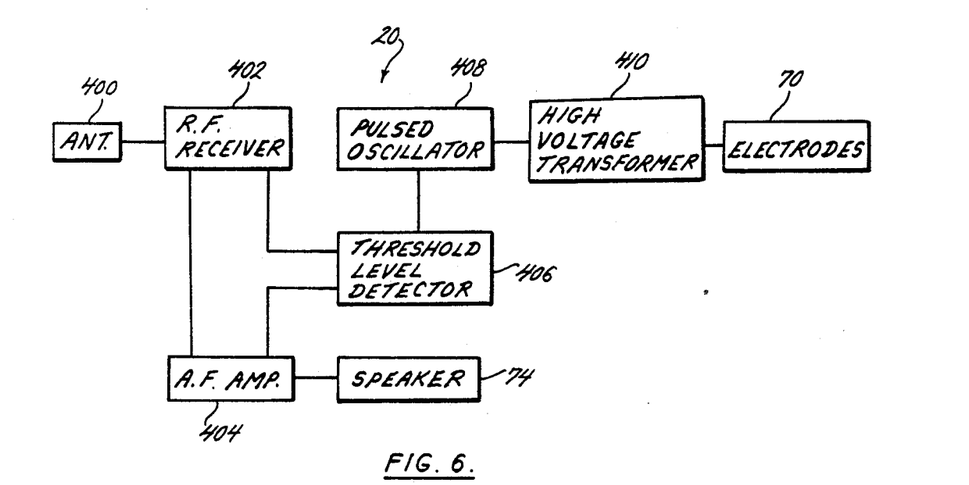
FIG. 6 is a block diagram of the pet collar.

The RF receiver unit 20 is shown in the block diagram of FIG. 6. It includes an antenna 430, and an RF receiver circuit 402 connected to this antenna 430. The RF receiver circuit 402 receives and decodes the RF signal into an audio signal for output to an audio amplifier 404, by way of an interconnecting threshold detector circuit 406. The audio amplifier 404 outputs an amplified audio signal to the miniature audio speaker 74 (FIGS. 2 and 3). The threshold detector circuit 406 outputs a control signal to a pulsed oscillator 408, which in response develops a pulsed output to be inputted to a high voltage transformer 410. The high voltage transformer 410 consequently develops pulsed shocks to be outputted to the shock-imparting electrodes 70 (FIGS. 3 and 4). The electronic circuits and components of this RF receiver unit 20 are more particularly shown in the electrical schematic of FIG. 11.

Figure 11:
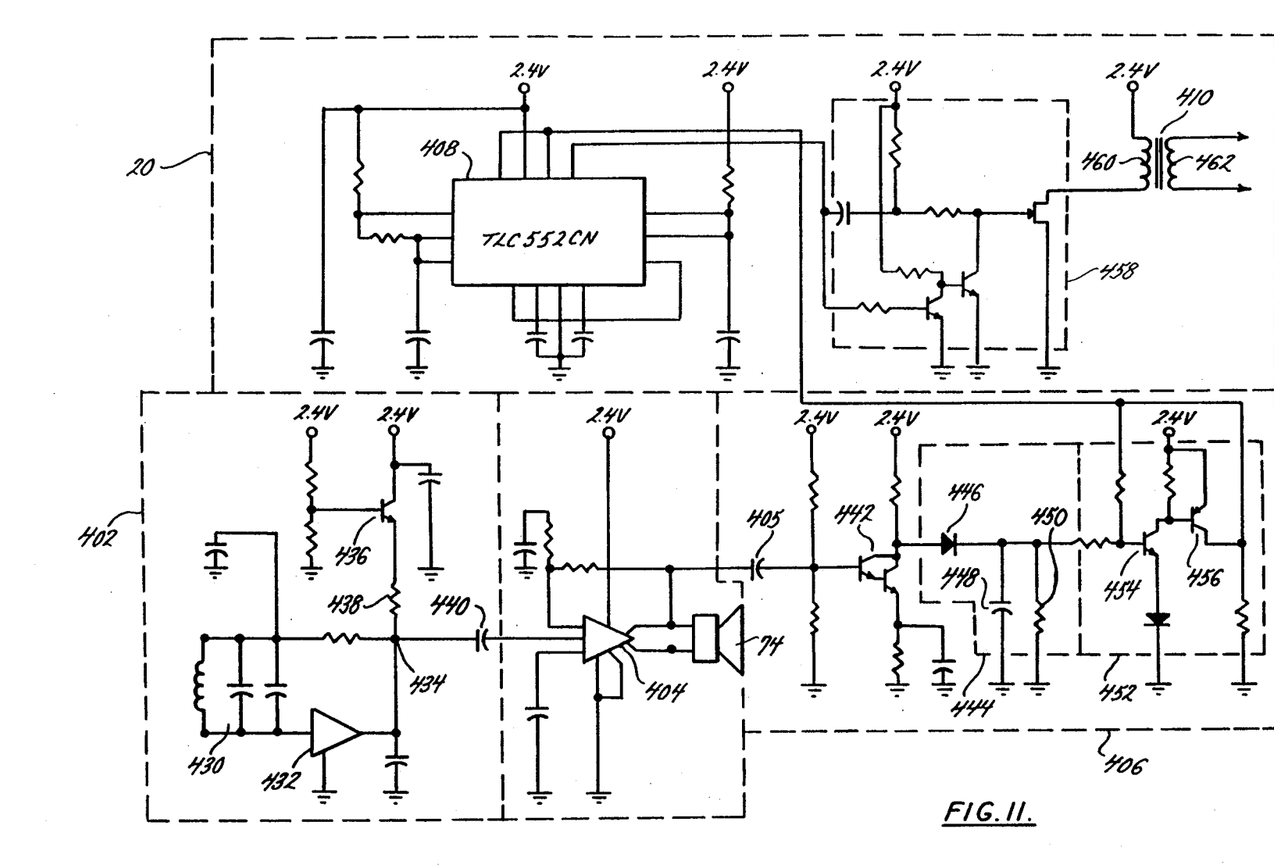
FIG. 11 is a schematic of the RF receiver and associated circuitry on the pet collar.

The RF receiver circuit 402 has an LC resonant circuit 430 tuned to receive the desired 455 kHz signal continuously transmitted over the boundary-determining loop antenna 18 (FIG. 1). The LC resonant circuit 430 outputs the RF signal to an RF detector 432 which may be a ZN414Z. The RF detector 432 demodulates the voice encoded command in the RF signal for output through junction 434 to the audio amplifier 404. The sensitivity and Q factor of this LC resonant circuit 430 are such that the RF signal is detectable when this pet collar receiver unit 20 is generally within 5 feet of the loop antenna 18 (FIG. 1). Upon this condition, the RF detector 432 will actively output audio signals through junction 434 to the audio amplifier 404, which can be an MC34119. The audio amplifier 404 outputs an amplified audio signal for driving both the miniature audio speaker 74 for audible playback thereof and to a high pass filter capacitor 405 which passes only the 18 kHz audio tone to the threshold detector circuit 406.

The threshold detector circuit 406 generally determines whether or not to operate the shock-imparting function of this RF receiver unit 20. In practice, when the RF receiver unit 20 is between 5 and 3 feet away from the loop antenna 18 (FIG. 1), just the audio playback functions of this unit 20 are activated. If, however, this pet collar receiver unit is brought to within closer than 3 feet of the loop antenna 18, then also the shock-imparting functions of this unit 20 are activated.

To achieve these ends, the threshold detector circuit has circuitry for monitoring the amplified 18 kHz audio signal. The voice portion is stripped, leaving only the constant tone 18 kHz, so as to provide greater reliability in detecting proximity to the antenna. This circuitry includes a Darlington amplifier circuit 442 that may be an MPSA12. The amplified output of the Darlington amplifier 442 is inputted into a waveform envelope detector circuit 444. This envelope detector circuit 444 monitors the peak amplitude values of the positive cycles of the 18 kHz audio signal waveform as conducted from the Darlington amplifier circuit 442. The envelope detector circuit 444 includes a rectifying diode 446, a capacitor 448, and a resistor 450. In general, this envelope detector circuit 444 develops a fluctuating DC voltage from the audio signal.

The output of the envelope detector circuit 444 is conducted to a switch circuit 452. The switch circuit 452 includes two transistors 454 and 456 connected as a two-stage, direct coupled amplifier. With no input voltage, or when the input voltage is below a characteristic barrier voltage, both transistors 454 and 456 are held below cut-off. When the control input voltage is raised above the barrier voltage, transistor 454 is turned on, consequently driving transistor 456 on. Conversely, when the control input voltage is allowed to fall below the barrier voltage, this switch circuit 452 switches off. As previously indicated, the switch circuit 452 generally turns on when this RF receiver unit 20 is within three feet of the loop antenna 18 (FIG. 1).

The collector current output of transistor 456 is the control signal which is conducted to the pulsed oscillator 408. The pulsed oscillator 408 may be a linear timer such as a TLC552CN. The pulsed oscillator 408 develops an electrical pulse train with pulses of about 1.5 milliseconds every 30 milliseconds for output to an amplifier circuit 458. The amplifier circuit 458 includes three transistors connected in cascade. The output of the amplifier circuit 458 is an amplified pulse which is inputted to the primary winding of high voltage transformer 410, inducing around 7 to 10 kV at low current levels in the secondary winding 462, for outputting to the shock-imparting electrodes 70 (FIGS. 3 and 4).

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A pet confinement system, the system including:
   means for emitting a voice encoded RF signal;
   means connected to said emitting means for generating said voice encoded RF signal from a prerecorded spoken command and broadcasting same over said emitting means; and
   a battery operated RF receiver adapted for attachment to said pet, said RF receiver having means for decoding said voice encoded RF signal and announcing said prerecorded command to said pet as said pet approaches within a predetermined distance to a boundary, thereby to encourage said pet to withdraw from said boundary.

2. The pet confinement system of claim 1 wherein said announcing means is adapted for attachment to said pet.

3. The pet confinement system of claim 2 further comprising means for recording said spoken command.

4. The pet confinement system of claim 3 wherein said recording means includes means for changing the recorded spoken command.

5. The pet confinement system of claim 4 further comprising a control panel; said control panel including said generating and broadcasting means, and said recording means; and wherein said control panel further comprises means for monitoring said emitting means for a failure to emit said voice encoded RF signal and means for indicating said failure to an operator.

6. The pet confinement system of claim 5 wherein said indicating means includes a visual display and means for producing an audio indication.

7. The pet confinement system of claim 6 wherein said audio indication means includes means for announcing a prerecorded spoken message.

8. The pet confinement system of claim 7 wherein said control panel further comprises means for connection to an A-C supply and a battery back-up, and said indicating means includes means for indicating that said control panel is operating on battery back-up.

9. The pet confinement system of claim 8 wherein said emitting means is a loop type antenna.

10. The pet confinement system of claim 1 wherein said generating means includes means for generating a pure tone, and means for mixing said pure tone into said voice encoded RF signal, and wherein said RF receiver further comprises means for detecting reception of said pure tone at a second magnitude of received signal strength, thereby indicating that said pet is within a second, closer, predetermined distance to said boundary, and means for applying a feedback signal to said pet in response thereto.

11. A pet confinement system, the system including:
    a loop type antenna for placement about a boundary of a defined area;
    a control panel connected to said antenna, said control panel including means for recording a spoken command, means for generating an RF signal encoded with said spoken command, and means for transmitting said encoded RF signal over said antenna; and
    a portable battery operated RF receiver adapted for attachment to said pet, said RF receiver including means for decoding and announcing said spoken command as said pet moves within a predetermined distance of said antenna.

12. The pet confinement system of claim 11 wherein said generating means includes means for generating a pure tone, and means for mixing said pure tone into said voice encoded RF signal, and wherein said RF receiver further comprises means for detecting an increased pure tone signal strength indicative of said pet being within a second, closer, predetermined distance of said antenna, and means for applying a negative feedback to said pet in response thereto.

13. The pet confinement system of claim 11 wherein said control panel includes means for monitoring said system for failures and means for indicating said system failures to an operator.

14. The pet confinement system of claim 13 wherein said indicating means includes a visual display for displaying preprogrammed messages and an announcing system for announcing prerecorded messages.

15. The pet confinement system of claim 14 wherein said monitoring means includes means for monitoring said loop type antenna, and said indicating means includes means for indicating faults with said loop type antenna.

16. The pet confinement system of claim 15 wherein said control panel further comprises means for connection to an A-C supply and a battery back-up; and said monitoring means includes means for monitoring said A-C supply; and said indicating means includes means for indicating that said control panel is operating on battery back-up.

17. In a pet confinement system including a loop antenna oriented about a boundary, said antenna having means for broadcasting a first signal which is received by a receiver attached to the pet, the improvement comprising a control panel for generating and supplying a second signal to said antenna and means for monitoring said antenna for a failure to conduct said second signal, and means for indicating said failure to an operator.

18. The pet confinement system of claim 17 wherein said control panel has means for connection to an AC power supply and a battery backup, and means for automatically switching to said battery backup upon interruption of power from said AC power supply.

19. The pet confinement system of claim 18 wherein said control panel indicating means includes means for indicating operation on battery backup power to an operator.

20. The pet confinement system of claim 19 wherein said indicating means includes a visual display and means for making an audio announcement.

21. In a pet confinement system including a loop antenna oriented about a boundary, said antenna having means for broadcasting a signal which is received by a receiver attached to the pet, the improvement comprising a control panel, said control panel having means for generating a prerecorded voice encoded command for broadcasting over said loop antenna so that said pet hears said prerecorded voice encoded command as it moves near the loop antenna.

22. The pet confinement system of claim 17 wherein said second signal is a D.C. signal.

23. The pet confinement system of claim 22 wherein said second signal is conducted to an electrical ground by said loop antenna, and said monitoring means includes means for detecting a loss of electrical connection to said electrical ground.

24. In a pet confinement system, said system including an antenna for defining an area within which said pet is desired to be confined, a transmitter for generating a signal for broadcast over said antenna, and a receiver adapted for attachment to said pet, the improvement comprising means for announcing a pre-recorded spoken command as said pet moves within a pre-determined distance of said antenna so that said signal activates said receiver.

25. The pet confinement system of claim 24 further comprising means for changing said pre-recorded spoken command.

26. The pet confinement system of claim 25 wherein said antenna is a loop antenna arranged generally about the periphery of said defined area, and further comprising means for monitoring said loop antenna to detect a break therein.

* * * * *